(12) United States Patent
Ishii et al.

(10) Patent No.: US 8,295,840 B2
(45) Date of Patent: Oct. 23, 2012

(54) MOBILE STATION AND FEEDBACK INFORMATION GENERATING METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 745 days.

(21) Appl. No.: 11/911,874

(22) PCT Filed: Apr. 12, 2006

(86) PCT No.: PCT/JP2006/307724
§ 371 (c)(1),
(2), (4) Date: Apr. 25, 2008

(87) PCT Pub. No.: WO2006/115055
PCT Pub. Date: Nov. 2, 2006

(65) Prior Publication Data
US 2009/0042571 A1    Feb. 12, 2009

(30) Foreign Application Priority Data
Apr. 18, 2005   (JP) ................. 2005-120380

(51) Int. Cl.
*H04B 1/00*   (2006.01)
*H04B 7/00*   (2006.01)
*H04W 36/00*  (2009.01)

(52) U.S. Cl. ........... 455/436; 455/69; 455/444; 370/331

(58) Field of Classification Search .......... 455/69, 455/436–444, 522; 370/331–334
See application file for complete search history.

(56) References Cited

U.S. PATENT DOCUMENTS

| | | | |
|---|---|---|---|
| 6,526,261 B1 | 2/2003 | Takeuchi et al. | |
| 6,754,473 B1* | 6/2004 | Choi et al. | 455/101 |
| 6,879,831 B2* | 4/2005 | Hamabe | 455/442 |
| 7,116,723 B2* | 10/2006 | Kim et al. | 375/267 |
| 7,116,944 B2* | 10/2006 | Das et al. | 455/69 |
| 7,133,682 B2* | 11/2006 | Seki et al. | 455/450 |
| 7,236,479 B2* | 6/2007 | Kim | 370/334 |
| 7,319,868 B2* | 1/2008 | Lindoff | 455/422.1 |
| 7,363,039 B2* | 4/2008 | Laroia et al. | 455/448 |

(Continued)

FOREIGN PATENT DOCUMENTS

CN    1543252 A    11/2004

(Continued)

OTHER PUBLICATIONS

3GPP TS 25.214, "Technical Specification Group Radio Access Network", Physical layer procedures (FDD), (Release 5), V5.10.0, pp. 1-64, 2004.

3GPP TR 25.899, "Technical Specification Group Radio Access Network", High Speed Download Packet Access (HSDPA) enhancements, (Release 6), V6.1.0, pp. 1-68, 2004.

(Continued)

*Primary Examiner* — Simon Nguyen
(74) *Attorney, Agent, or Firm* — Oblon, Spivak, McClelland, Maier & Neustadt, L.L.P.

(57) ABSTRACT

The present invention provides a mobile station for communicating with a radio base station wherein a closed loop transmit diversity for transmission with use of a plurality of antennas is applied to the radio base station, comprising: a feedback information control unit controlling a feedback information control process based on the number of radio base stations simultaneously communicating with the mobile station. The mobile station can generate feedback information suitable for a shared physical channel in an intra-cell handover. On the other hand, the mobile station can generate feedback information suitable for a dedicated physical channel in an inter-cell handover.

4 Claims, 7 Drawing Sheets

U.S. PATENT DOCUMENTS

| | | | |
|---|---|---|---|
| 7,924,784 B2 * | 4/2011 | Seki et al. | 370/331 |
| 2004/0233871 A1 * | 11/2004 | Seki et al. | 370/331 |
| 2006/0240826 A1 * | 10/2006 | Shinozaki | 455/436 |
| 2006/0286997 A1 * | 12/2006 | Seki et al. | 455/525 |

FOREIGN PATENT DOCUMENTS

| | | |
|---|---|---|
| JP | 10-93532 | 4/1998 |
| JP | 10-190616 | 7/1998 |
| JP | 2000-252917 | 9/2000 |
| JP | 2004-135339 | 4/2004 |

OTHER PUBLICATIONS

Office Action issued Sep. 1, 2010 in Chinese Application No. 200680012994.2 (With English Translation).

European Office Action issued on Mar. 28, 2011 in corresponding European Application No. 06 731 670.3.

3GPP TS 25.214, "Technical Specification Group Radio Access Network; Physical Layer Procedures (FDD)", $3^{rd}$ Generation Partnership Project, (Release 6), V6.5.0, Mar. 2005, pp. 1-69.

* cited by examiner

MOBILE STATION AND FEEDBACK INFORMATION GENERATING METHOD

TECHNICAL FIELD

The present invention relates to a downlink mobile station for controlling transmit diversity in a mobile communication system and a method of generating feedback information in the mobile station.

BACKGROUND ART

In general, "fading" arises in radio communication, and causes degraded transmission quality, that is, significant degradation of the bit error rate characteristic.

As one method for compensating for degraded transmission quality caused by the phasing, "transmit diversity" is commonly known. In the following, one type of transmit diversity, "closed loop type transmit diversity mode 1", is described (see non-patent document 1).

Figure 1:
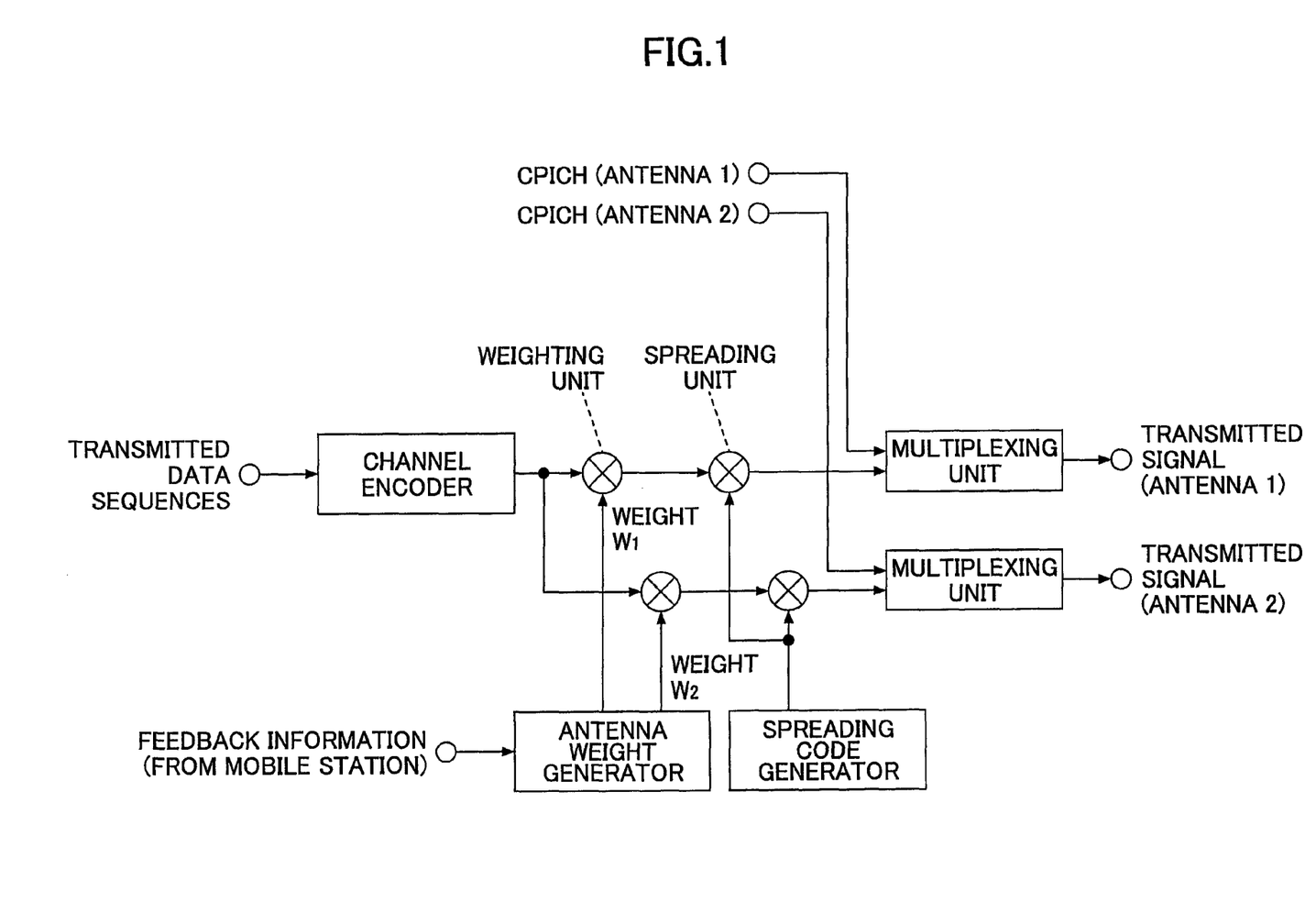
FIG. 1 is a diagram illustrating an exemplary configuration of a transmission unit of a closed loop type transmit diversity.
Figure 2:
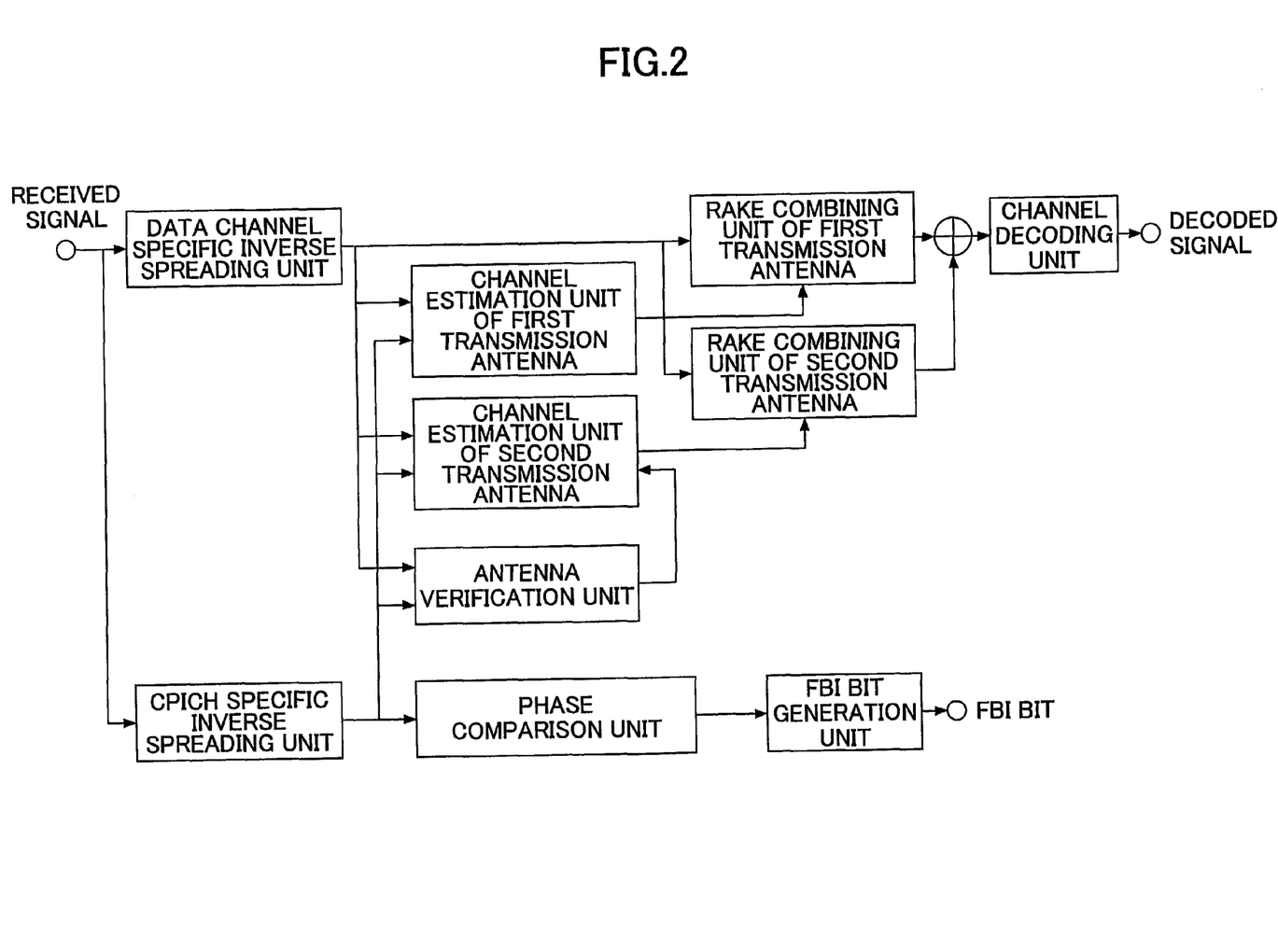
FIG. 2 is a diagram illustrating an exemplary configuration of a reception unit of the closed loop type transmit diversity.

FIG. 1 illustrates an exemplary configuration of a transmission unit of a closed loop type transmit diversity, and FIG. 2 illustrates an exemplary configuration of a reception unit of the closed loop type transmit diversity. In a closed loop type transmit diversity, two sequences of transmitted data are multiplied with respective complex weights based on a feedback information (FBI) bit from a mobile station, $$w_1 = A_1 e^{i\phi_1};$$

and $$w_2 = A_2 e^{i\phi_2}.$$

Then, a spreading operation is performed on them, and the resulting sequences are transmitted. First, a radio base station transmits common pilot channels (CPICH) with the same carrier phase via two antennas. The CPICHs transmitted via the two antennas spread with the same spreading code, and orthogonalization is achieved by changing a pilot symbol. A mobile station generates a FBI bit for controlling a reception carrier phase difference of a signal separated after inverse spreading of the CPICHs transmitted via the two antennas in a reception device thereof, and transmits the FBI bit over a dedicated physical control channel (DPCCH) in an uplink dedicated physical channel (DPCH). By controlling the transmission carrier phase of antenna 2 with use of the FBI bit from the mobile station, it is possible to reduce bit errors caused by reception signal power decrease due to fading. In a transmission unit of a radio base station, antenna weights $w_1$ and $w_2$ generated based on the FBI bit from the mobile station are multiplied with sequences of transmitted data for two antennas, and the resulting sequences are transmitted.

A closed loop type diversity mode 1, which is specified in accordance with 3GPP, controls the transmission carrier phase of DPCH of the second antenna with resolution of $\pi/4$ carrier phase so that received signals via the two antennas can have approximately the same phase in reception at the mobile station. In the following, an exemplary operation in the case where closed loop type transmit diversity mode 1 is applied to a dedicated physical channel DPCH is described in detail.

Transmission amplitude of two antennas in the slot n is represented as $$A_{1,n} = A_{2,n} = \frac{1}{\sqrt{2}},$$

Transmission carrier phase is represented as $$\phi_{1,n}=0, \text{ and } \phi_{2,n}=\{\pm\pi/4,\pm 3\pi/4\}.$$

In other words, the weights $w_1$ and $w_2$ have values $$w_1 = \frac{1}{\sqrt{2}}, \text{ and}$$

$$w_2 = \frac{1}{\sqrt{2}} e^{i\phi_{2,n}},$$

respectively.

The mobile station computes w under which P is maximum in the following formula, $$P = w^H H^H H w \quad (1),$$

where $H=[h_1, h_2]$ and $w=[w_1, w_2]^T$, and $h_1$ and $h_2$ are as follows.

$h_1$: estimated channel impulse response from transmission antenna 1 (derived from CPICH from the transmission antenna 1)

$h_2$: estimated channel impulse response from transmission antenna 2 (derived from CPICH from the transmission antenna 2)

Specifically, the mobile station estimates reception carrier phases $\theta_{1,n}^{CP}$ and $\theta_{2,n}^{CP}$ transmitted by the two antennas, and generates FBI bit $b_n$ in the slot n. Here, assuming that $$w_2 = \frac{1}{\sqrt{2}} e^{i\phi_{2,n}},$$

the following equation holds $$\phi_{2,n}=\theta_{1,n}^{CP}-\theta_{2,n}^{CP}.$$

Since $\Phi_{2,n}$ has a discrete value, it is computed as follows.

For an even slot n, if $-\pi/2 \leq (\theta_{1,n}^{CP}-\theta_{2,n}^{CP}) \leq \pi$, then $b_n=0$, otherwise $b_n=1$. For an odd slot n, if $0 \leq (\theta_{1,n}^{CP}-\theta_{2,n}^{CP}) \leq \pi$, then $b_n=0$, otherwise $b_n=1$.

The radio base station determines a temporal transmission carrier phase $\phi_{2,(n+1)}$ in the (n+1)th slot of DPCH in the second antenna depending on a decode result $\hat{b}_n$ of the FBI bit (if no FBI bit exists, $\hat{b}_n=b_n$) as follows.

For an even number n, if $\hat{b}_n=0$, then $\phi_{2,(n+1)}=0$, otherwise $\phi_{2,(n+1)}=\pi$. For an odd number n, if $\hat{b}_n=0$, then $\phi_{2,(n+1)}=\pi/2$, otherwise $\phi_{2,(n+1)}=-\pi/2$. Finally, the transmission carrier phase $\Phi_{2,(n+1)}$ of the second antenna in the (n+1)th slot is derived from temporal carrier phases of the slots n and (n+1) as follows;

$$\phi_{2,(n+1)}=(\phi_{2,n}+\phi_{2,(n+1)})/2.$$

Figure 3:
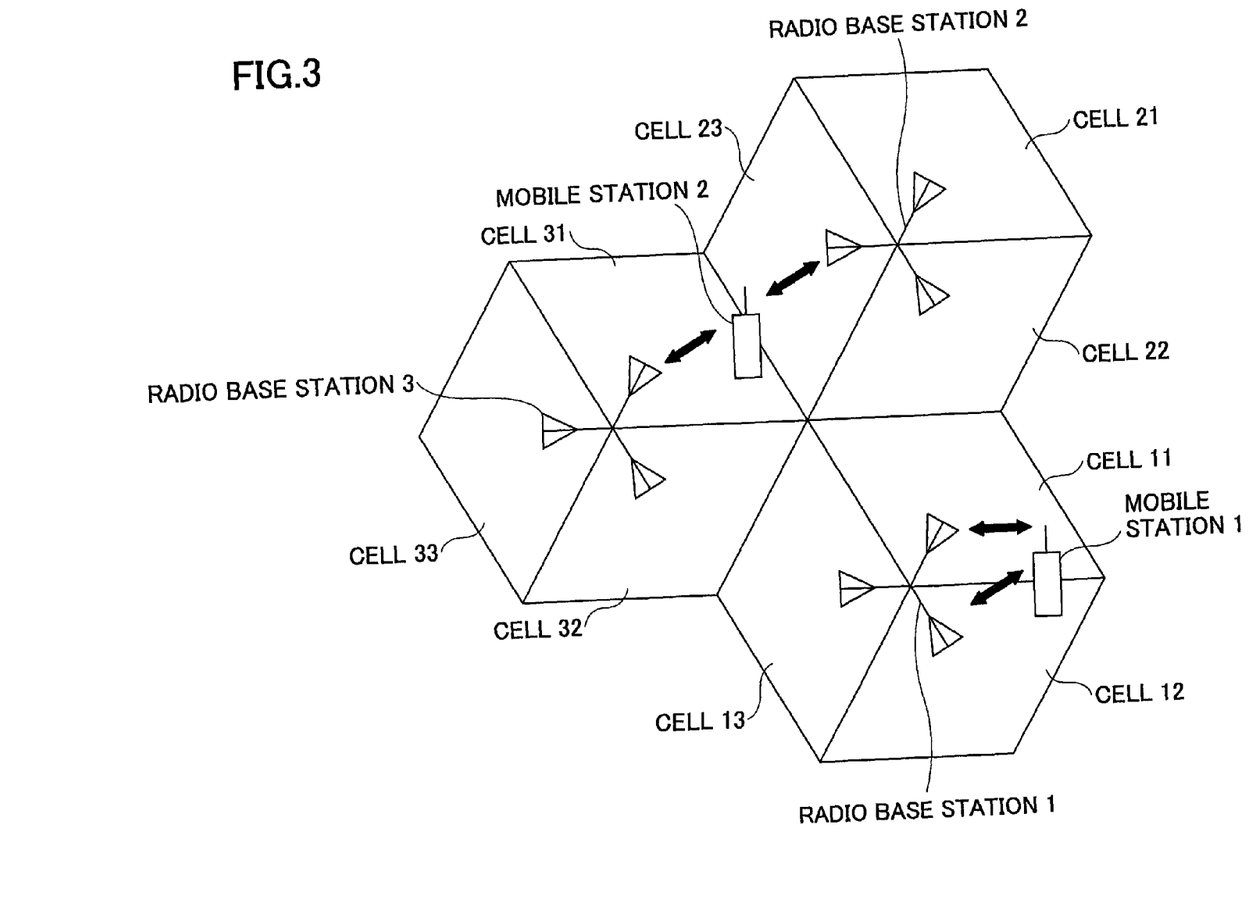
FIG. 3 is a diagram illustrating an exemplary relationship between an intra-cell handover and an inter-cell handover.

Meanwhile, in a commonly used mobile communication system, an area covered by a single radio base station is partitioned into a plurality of smaller cells (also referred to as sectors), and communications are actually carried out for each cell. FIG. 3 is a schematic view illustrating exemplary cells in the mobile communication system. In FIG. 3, an exemplary configuration where three radio base stations 1-3 each includes three respective sectors is illustrated. Communication control for communicating to a plurality of cells simultaneously, which is referred to as soft hand over, is carried out in a dedicated physical channel (DPCH) in a 3GPP downlink. For the simultaneously communicating cells, there are two cases. One is the case where the cells are different cells within the same base station. The other is the case where the cells are cells within different base stations. In these cases, the simultaneous communications within different cells within the same base station are called intra-cell handover, and the simultaneous communications within plural cells belonging to different base stations are called inter-cell handover. In FIG. 3, a mobile station 1 performs the intra-cell handover between cells 11 and 12 within a radio base station 1, whereas a mobile station 2 performs the inter-cell handover between a cell 23 in a radio base station and a cell 31 in a radio base station 3.

Then, if the closed loop type transmit diversity control is carried out and the soft handover is performed, the mobile station generates a FBI bit for signals from all the simultaneously communicating cells so that reception carrier phase difference can be optimal. One specific computation of the FBI bit is as follows.

In the case of the soft handover (in the case of communications to plural cells), the vector w is derived so that P as presented below is maximized.

$$P = w^H(H_1^H H_1 + H_2^H H_2 + \ldots)w \qquad (2),$$

where $H_i$ is an estimated channel impulse response associated with the ith cell.

In the above description, the operation corresponding to the case where transmit diversity is applied to a downlink dedicated physical channel DPCH in soft handover has been described. Next, an exemplary operation corresponding to the case where closed loop type transmit diversity mode 1 is applied to a high speed physical downlink shared channel (HS-PDSCH) being a downlink shared channel is described below.

HS-PDSCH is a shared physical channel for carrying data in transmission scheme HSDPA (High Speed Downlink Packet Access) for fast downlink data transmission. Other physical channel include HS-SCCH (High Speed Shared Control Channel) being a shared control channel and A-DPCH (Associated-Dedicated Physical Channel) dedicated to each mobile station.

Similar to the case of a dedicated physical channel, the transmit diversity in HSDPA generates a FBI bit from the phase difference of CPICHs from the two antennas, transmits the FBI bit in an uplink DPCH, and controls the phase of HS-PDSCH from the second antenna in a downlink. However, HS-PDSCH in HSDPA does not perform the soft handover like the dedicated physical channel (i.e. does not communicate to multiple cells simultaneously), but always communities to a single cell. In other words, the vector w computed with the formula (1) becomes the optimum.

In HSDPA, HS-PDSCH communicates to a single cell, whereas the other dedicated physical channels communicate to a plurality of cells. Thus, since the optimum vector w is computed with the respective formulae (1) and (2), it is difficult to compute the optimum vector w for both of them. Thus, the non-patent document 2 discloses that the vector w is derived with the following formula.

$$P = w^H(\alpha(H_1^H H_1) + (1-\alpha)(H_2^H H_2 + H_3^H H_3 + \ldots))w \qquad (3),$$

where $H_1$ represents an estimated channel impulse response associated with a cell communicating by HS-PDSCH, $H_2$, $H_3$, ... estimated channel impulse responses associated with cells communicating not by HS-PDSCH but by dedicated physical channels, and $\alpha$ is a real value ranging between 0 and 1.

For example, if $\alpha$ is set as 0.7, it is possible to compute a more appropriate w for not only HS-PDSCH but also the dedicated physical channels.

Also, the non-patent document 2 discloses some technique referred to as Fast Adaptive Emphasis. Specifically, in the case where the above-mentioned HD-PDSCH only communicates within a single cell and the dedicated physical channel communicates with a plurality of cells, the parameter $\alpha$ has different values depending on whether HS-PDSCH is assigned to the relevant mobile station. By using this technique, only if HS-PDSCH is transmitted in burst, the optimal $\alpha$ to HS-PDSCH can be used to compute antenna weights without transmission of the HS-PDSCH, whereas when only the dedicated physical channel is transmitted, the optimal $\alpha$ to the dedicated physical channel can be used to compute the antenna weights.

Non-patent document 1: 3GPP TS25.214 v5.a.0
Non-patent document 2: 3GPP TR25.899 v6.1.0

DISCLOSURE OF INVENTION

Problem to be Solved by the Invention

As stated above, in HSDPA, a mobile station computes appropriate antenna weights associated with HS-PDSCH and other dedicated physical channels in soft handover, and generates a FBI bit.

In general, characteristics of HS-PDSCH only communicating in a single cell hardly vary between the intra-cell handover and the inter-cell handover. As to the dedicated physical channel communicating to a plurality of cells, however, it is known that the characteristics in the inter-cell handover are significantly degraded compared to the characteristics in the intra-cell handover.

On the other hand, conventional methods do not handle the inter-cell handover and the intra-cell handover differently. For this reason, there is a problem that appropriate antenna weights are not computed for the respective cases of the inter-cell handover and the intra-cell handover.

The present invention is intended to solve the above-mentioned problem, and more particularly is intended to provide a mobile station and a method enabling appropriate antenna weights to be computed for the respective inter-cell and intra-cell handovers.

Means for Solving the Problem

The above object of the present invention can be achieved by a mobile station for communicating with a radio base station wherein closed loop transmit diversity for transmission with use of a plurality of antennas is applied to the radio base station, comprising: a feedback information control unit controlling a feedback information control process based on the number of radio base stations simultaneously communicating with the mobile station.

The feedback information control unit may control the feedback information generation process based on whether the mobile station performs an intra-cell handover or an inter-cell handover.

The radio mobile station may include one or more cells, and in case of the mobile station communicating by means of a first channel for communicating with one cell of the one or more cells and a second channel for communicating with a plurality of cells of the one or more cells simultaneously, the feedback information control unit may generate feedback information suitable for the first channel if the mobile station is communicating with a single radio base station and generate feedback information suitable for the second channel if the mobile station is communicating with plural radio base stations simultaneously.

According to the mobile station, it is possible to control an antenna weight generation process for respective intra-cell handover and inter-cell handover. Since a characteristic of a dedicated physical channel (DPCH) is stable in the intra-cell handover, it is possible to generate feedback information suitable for a shared physical channel (HS-PDSCH). On the other hand, since a characteristic of a dedicated physical channel communicating with a plurality of cells may be degraded in the inter-cell handover, it is possible to generate feedback information suitable for the dedicated physical channel.

The feedback information control unit may control the feedback information generation process based on the number of radio base stations communicating with the mobile station simultaneously and whether the first channel is assigned to the mobile station.

ADVANTAGE OF THE INVENTION

As stated above, according to the embodiment of the present invention, it is possible to improve throughput of communication schemes using transmit diversity while stabilizing the quality of a dedicated physical channel.

LIST OF REFERENCE SYMBOLS

401: mobile station
403: radio base station
405: feedback information control unit
501: mobile station
503: feedback information control unit
505: CPICH specific inverse spreading unit
507: phase comparison unit
509: α determination unit
511: FBI bit generation unit

BEST MODE FOR CARRYING OUT THE INVENTION

Embodiments of the present invention are described in detail below with reference to the accompanying drawings.

Figure 4:
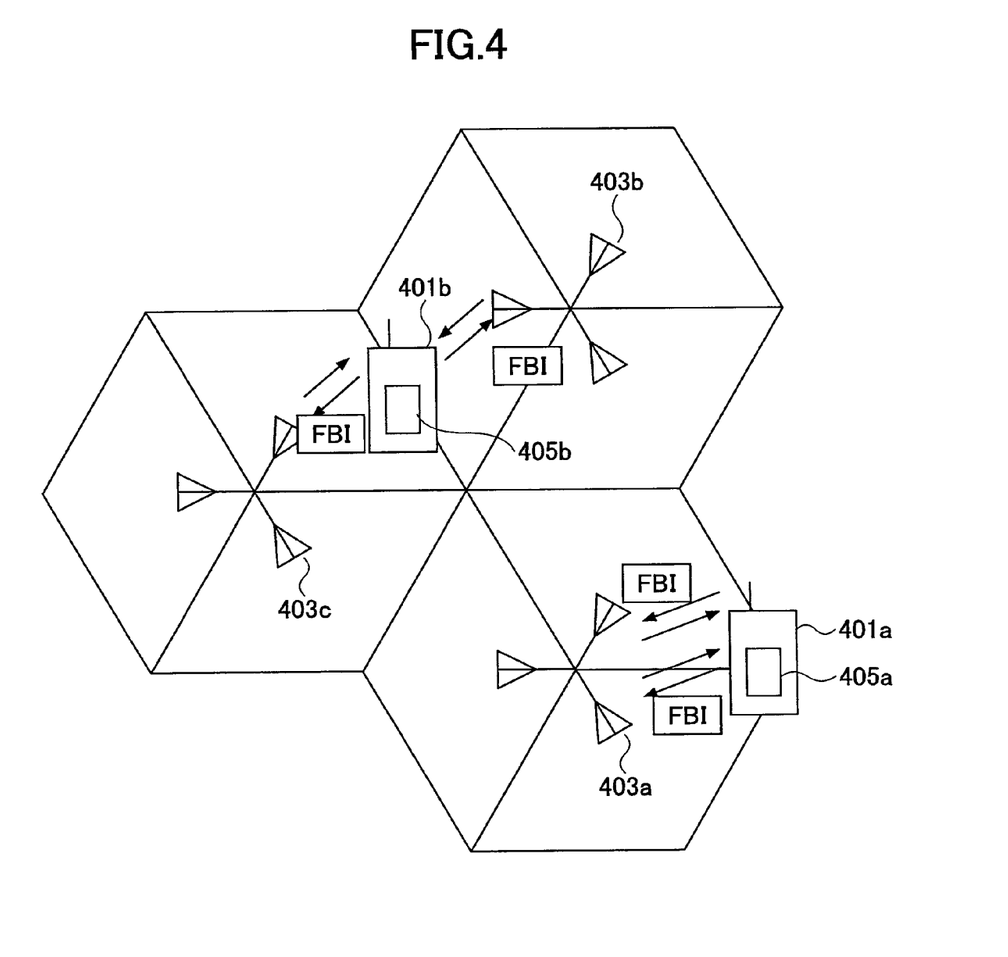
FIG. 4 is a diagram illustrating mobile stations according to an embodiment of the present invention and radio base stations communicating with the mobile stations.

FIG. 4 is a diagram illustrating a mobile station 401 to which the present invention is applied and a radio base station 403 communicating with the mobile station. The mobile station 401 includes a feedback information control unit 405 computing antenna weights for an inter-cell handover and an intra-cell handover and generating feedback information. The mobile station 401 includes some components other than the feedback information control unit 405 such as channel estimation, antenna verification, RAKE combining and channel decoding. These components are similar to those of conventional mobile stations, and thus the description thereof is omitted. The mobile station 401 transmits feedback information (FBI bit) generated by the feedback information control unit 405 to the radio base station 403. The radio base station 403 may be configured as illustrated in FIG. 2, for example. The radio base station 403 weighs sequences of transmitted data based on the FBI bit from the mobile station 401, and transmits a signal to the mobile station 401 via two antennas.

According to the embodiment of the present invention, the computation of antenna weights can be controlled depending on whether the mobile station 401 is associated with the inter-cell handover or the intra-cell handover, and thus improved reception quality is achieved.

An exemplary configuration of a mobile station, in particular in terms of the feedback information control unit, is described in detail below.

[Configuration of Mobile Station]

Figure 5:
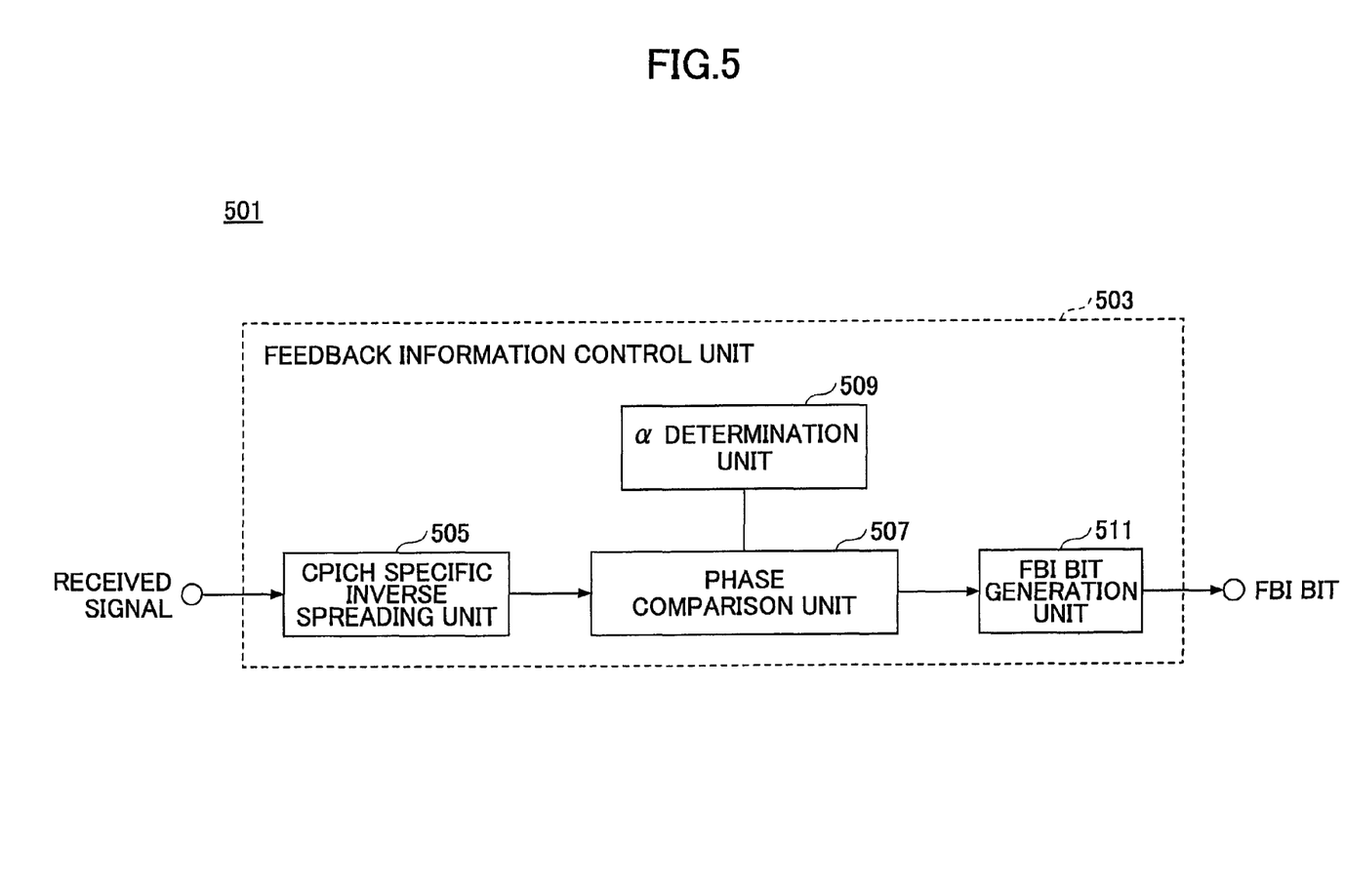
FIG. 5 is a diagram illustrating an exemplary configuration of a mobile station according to an embodiment of the present invention.

FIG. 5 is a diagram illustrating a feedback information control unit 503 of a mobile station 501 according to an embodiment of the present invention in detail. The feedback information control unit 503 includes a CPICH specific inverse spreading unit 505, a phase comparison unit 507, an α determination unit 509, and a FBI bit generation unit 511.

The CPICH specific inverse spreading unit 505 performs inverse spreading on a received signal by means of a predefined scrambling code and a CPICH channelization code, and supplies the resulting CPICH symbol to the phase comparison unit 507. In this embodiment, the received signal may be a signal resulting from some operation performed on an incoming signal received via an antenna, such as amplification in a low-noise amplifier, frequency conversion, linear amplification in an automatic gain control amplifier, orthogonal detection, A/D conversion, and band limiting in a root Nyquist filter. In this embodiment, in simultaneous communications with a plurality of cells, inverse spreading is performed on CPICHs supplied from the cells, and the obtained CPICH symbols are supplied to the phase comparison unit 507.

The phase comparison unit 507 uses the CPICH symbols received from the CPICH specific inverse spreading unit 505 to determine the phase difference between a signal from the first transmission antenna and a signal from the second transmission antenna, and supplies the determination result to the FIB bit generation unit 511.

Specifically, in communication with a single cell, the phase comparison unit 507 computes w such that the parameter P in the following formula is maximized;

$$P = w^H H^H H w \quad (4),$$

where $H=[h_1, h_2]$ and $w=[w_1, w_2]^T$, and $h_1$ and $h_2$ mean estimated channel impulse responses from the antennas 1 and 2, respectively.

The phase comparison unit 507 supplies the vector w to the FBI bit generation unit 511. In communications with a plurality of cells, on the other hand, the phase comparison unit 507 computes w such that the parameter P in the following formula is maximized;

$$P = w^H(\alpha(H_1^H H_1) + (1-\alpha)(H_2^H H_2 + H_3^H H_3 + \ldots))w \quad (5)$$

where $H_1$ represents an estimated channel impulse response associated with a cell communicating by HS-PDSCH, $H_2$, $H_3$, . . . estimated channel impulse responses associated with cells communicating by not HS-PDSCH but dedicated physical channels, and $\alpha$ is a real value ranging between 0 and 1.

The phase comparison unit 507 supplies the vector w to the FBI bit generation unit 511. As stated below, the parameter $\alpha$ in the formula (5) is determined in the $\alpha$ determination unit 509 based on the number of simultaneously communicating radio base stations (whether the inter-cell handover or the intra-cell handover is performed), and then is supplied to the phase comparison unit 507.

In the communications with plural cells, the $\alpha$ determination unit 509 controls the parameter $\alpha$ depending on whether a dedicated physical channel is performing the inter-cell handover or the intra-cell handover. In communications with three or more cells, if the cells are located within a single base station, it is determined that the intra-cell handover is performed. On the other hand, if the cells are located within two or more base stations, it is determined that the inter-cell handover is performed.

If it is determined that the intra-cell handover is performed, the $\alpha$ determination unit 509 may set the parameter $\alpha$ to the value optimized for HS-PDSCH (ex. $\alpha=1.0$). On the other hand, if it is determined that the inter-cell handover is performed, the $\alpha$ determination unit 509 may set the parameter $\alpha$ to the value optimized for the dedicated physical channel (ex. $\alpha=0.5$). In this setting, in the case of the inter-cell handover where the quality of the dedicated physical channel may be degraded, the quality of the dedicated physical channel can be stabilized with use of the value optimized for the dedicated physical channel. On the other hand, in the case of the intra-cell handover where the quality of the dedicated physical channel may be less degraded, improved throughput of HSDPA is achieved with use of the value optimized for HS-PDSCH. In this embodiment, the parameter $\alpha$ is set to 0.5 or 1.0, but the parameter $\alpha$ can be set to a more suitable value such as 0.6 or 0.9 more finely.

The FBI bit generation unit 511 generates a FBI bit based on the vector w supplied from the phase comparison unit 507.

[First Embodiment]

Figure 6:
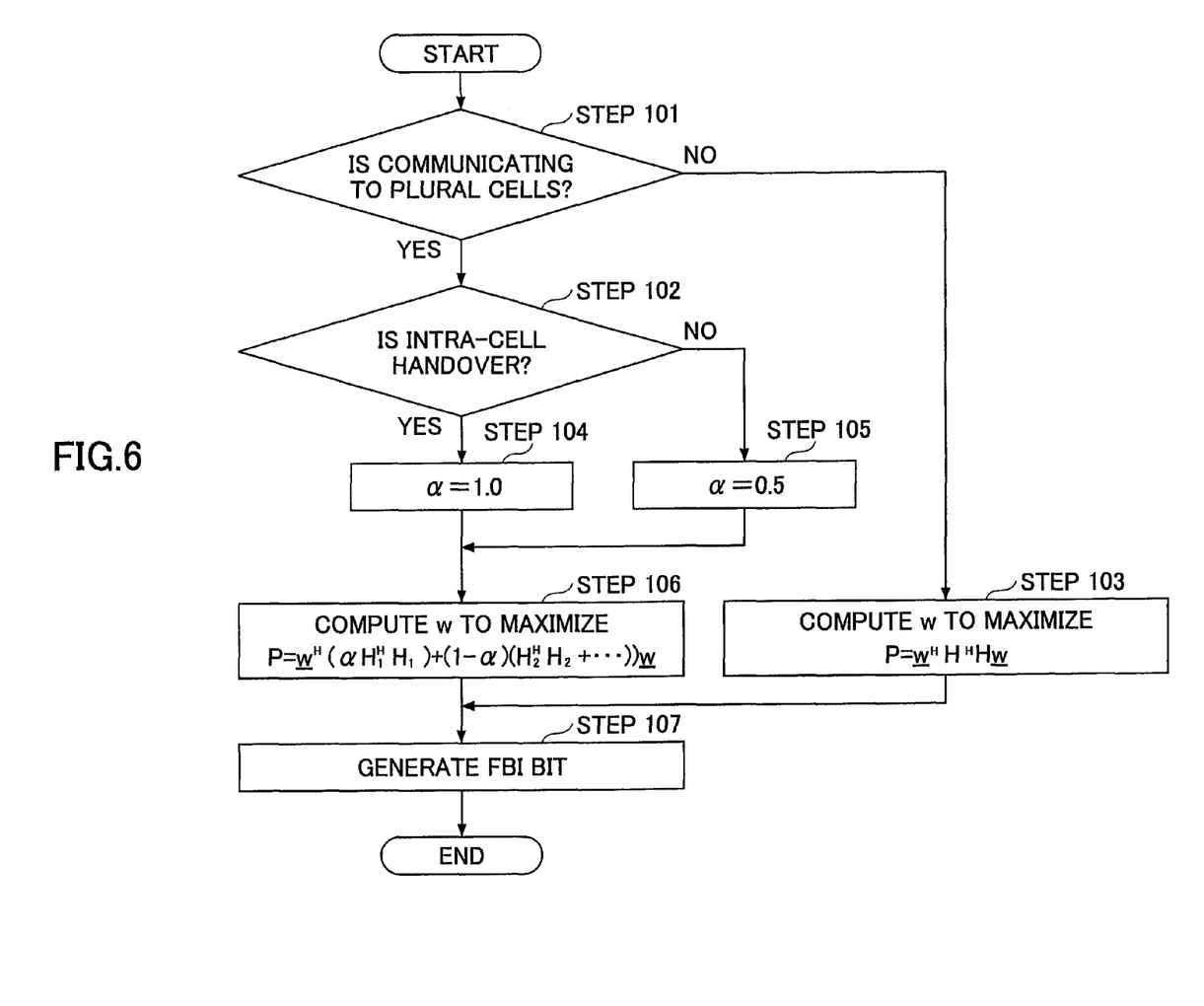
FIG. 6 is a flowchart illustrating a feedback information generation procedure according to a first embodiment of the present invention.

Next, an exemplary control method for feedback information in a mobile station configured as illustrated in FIG. 5 is described with reference to FIG. 6. FIG. 6 is a flowchart illustrating a feedback information generation procedure according to the first embodiment of the present invention.

At step 101, it is determined whether a mobile station is communicating with a plurality of cells simultaneously. In other words, it is determined whether a dedicated physical channel is in soft handover condition. If it is determined that the mobile station is communicating with plural cells simultaneously, the control proceeds to step 102. On the other hand, if it is determine that the mobile station is not communicating with plural cells simultaneously, the control proceeds to step 103.

In step 102, it is determined whether the soft handover is an intra-cell handover. If it is determined that the soft handover is an intra-cell handover, the control proceeds to step 104. On the other hand, if it is determined that the soft handover is an inter-cell handover, the control proceeds to step 105.

At step 103, since it is determined that the mobile station is communicating with a single cell, the phase comparison unit 507 of the mobile station computes antenna weights w such that the parameter P in the following formula is maximized;

$$P = w^H H^H H w.$$

At step 104, since the intra-cell handover, where a dedicated physical channel has a stable characteristic, is performed, the $\alpha$ determination unit 509 of the mobile station sets the parameter $\alpha$ as $\alpha=1.0$ such that the parameter $\alpha$ is optimized for HS-PDSCH.

At step 105, in the inter-cell handover, where a dedicated physical channel may have a degraded characteristic, the $\alpha$ determination unit 509 of the mobile station sets the parameter $\alpha$ as $\alpha=0.5$ such that the dedicated physical channel can have the more stable characteristic.

At step 106, since it is determined that the mobile station is communicating with the plural cells, the phase comparison unit 507 of the mobile station computes the antenna weights w such that the parameter P in the following formula is maximized;

$$P = w^H(\alpha(H_1^H H_1) + (1-\alpha)(H_2^H H_2 + H_3^H H_3 + \ldots))w.$$

At step 107, the FBI bit generation unit 511 of the mobile station generates a FBI bit based on the computed vector w.

[Second Embodiment]

Figure 7:
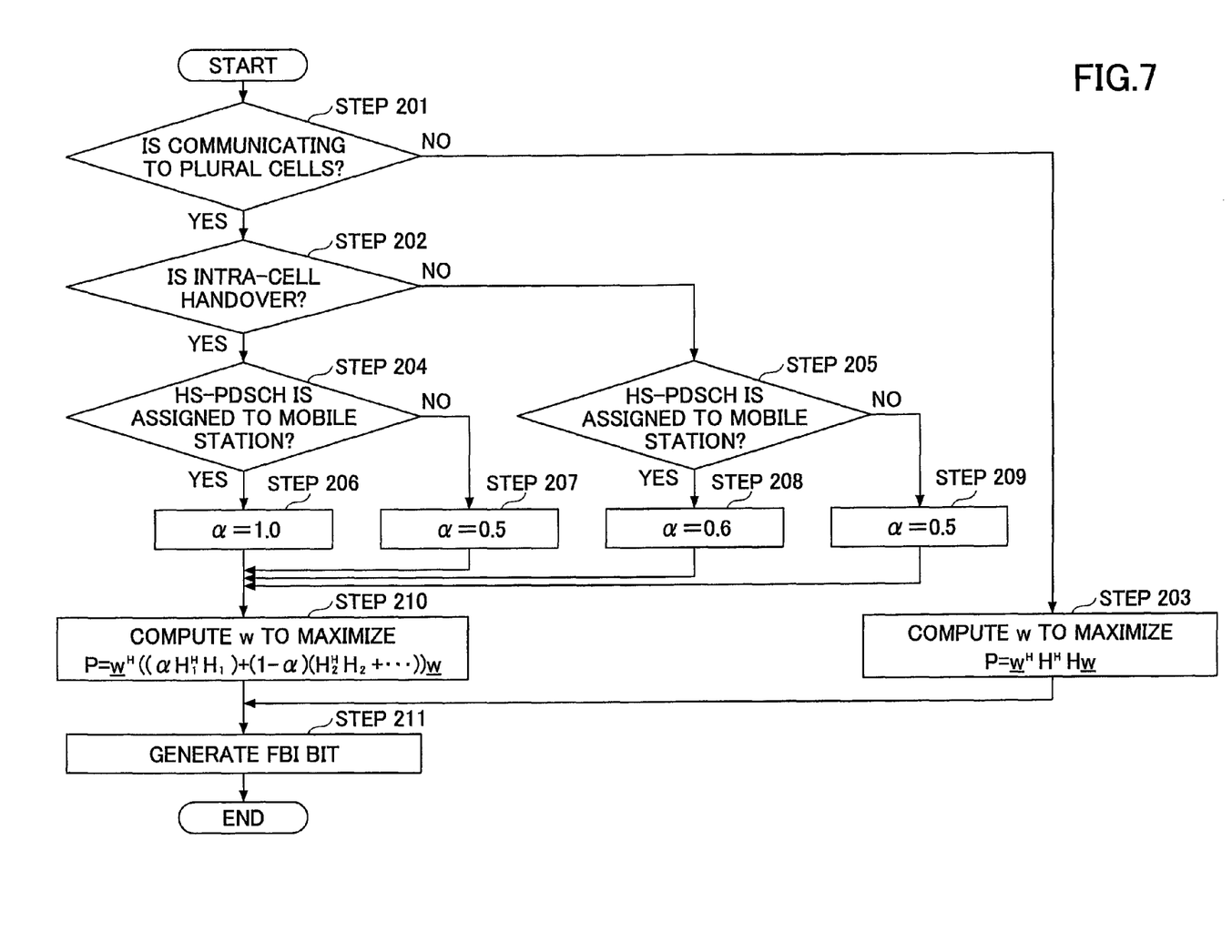
FIG. 7 is a flowchart illustrating a feedback information generation procedure according to a second embodiment of the present invention.

An exemplary feedback information control method in the case where a mobile station configured as FIG. 5 is performing fast adaptive emphasis is described with reference to FIG. 7 below. FIG. 7 is a flowchart illustrating an exemplary feedback information generation procedure according to the second embodiment of the present invention.

Similarly to the first embodiment, at step 210, it is determined whether a mobile station is communicating with a plurality of cells simultaneously. In other words, it is determined whether a dedicated physical channel is in soft handover condition. If it is determined that the mobile station is communicating with plural cells simultaneously, the control proceeds to step 202. On the other hand, if it is determined that the mobile station is not communicating with plural cell simultaneously, the control proceeds to step 203.

In step 202, it is determined whether the soft handover is an intra-cell handover. If it is determined that the soft handover is an intra-cell handover, the control proceeds to step 204, and on the other hand, if it is determined that the soft handover is an inter-cell handover, the control proceeds to step 205.

In step 203, since the mobile station is only communicating with a single cell, the phase comparison unit 507 of the mobile station computes antenna weights w such that the parameter P in the following formula is maximized;

$$P = w^H H^H H w.$$

At step 204, it is determined whether HS-PDSCH is assigned to the mobile station. If it is determined that the HS-PDSCH is assigned to the mobile station, the control proceeds to step 206, and on the other hand, if it is determined that the HS-PDSCH is not assigned to the mobile station, the control proceeds to step 207. In this embodiment, the determination as to whether the HS-PDSCH is assigned to the mobile station can be made with reference to control information mapped to a control channel HS-SCCH transmitted from the HS-PDSCH since the previous two slots.

Similarly, in step 205, it is determined whether the HS-PDSCH is assigned to the mobile station. If it is determined that the HS-PDSCH is assigned to the mobile station, the control proceeds to step 208, and on the other hand, if it is determined that the HS-PDSCH is not assigned to the mobile station, the control proceeds to step 209.

At step 206, since the soft handover is an intra-cell handover, where a characteristic of a dedicated physical channel is stable, and the HS-PDSCH is assigned to the mobile station, the α determination unit 509 of the mobile station sets the parameter α as α=1.0 such that the parameter α is optimized for the HS-PDSCH.

At step 207, since the soft handover is an intra-cell handover, where a characteristic of a dedicated physical channel is stable, but the HS-PDSCH is not assigned to the mobile station, the α determination unit 509 of the mobile station sets the parameter α as α=0.5 such that the parameter α is optimized for the dedicated physical channel.

At step 208, since the soft handover is an inter-cell handover, where a characteristic of a dedicated physical channel may be degraded, and the HS-PDSCH is assigned to the mobile station, the α determination unit 509 of the mobile station sets the parameter α as α=0.6 to make the characteristic of the dedicated physical channel more stable.

At step 209, since the soft handover is an inter-cell handover, where a characteristic of a dedicated physical channel is stable, but the HS-PDSCH is not assigned to the mobile station, the α determination unit 509 of the mobile station sets the parameter α as α=0.5 such that the parameter α is optimized for the dedicated physical channel.

Since the mobile station is communicating with the plural cells, at step 210, the phase comparison unit 507 of the mobile station computes antenna weights w such that the parameter P in the following formula is maximized;

$$P = w^H(\alpha(H_1^H H_1) + (1-\alpha)(H_2^H H_2 + H_3^H H_3 + \ldots))w.$$

At step 211, the FBI bit generation unit 511 of the mobile station generates a FBI bit based on the computed vector w.

As stated above, according to this embodiment, the parameter α can be adaptively controlled depending on whether the soft handover is an intra-cell handover and an inter-cell handover or whether HS-PDSCH is transmitted. Thus, improved throughput of the HSDPA is achieved while stabilizing the characteristic of the dedicated physical channel. The phrase "stabilizing the characteristic of the dedicated physical channel" used herein means that transmission power of the dedicated physical channel can be reduced, for example.

Also, the above descriptions of the embodiments have been focused on the fast packet transmission scheme HSDPA in 3GPP, but the present invention is not limited to the HSDPA and is applicable to other communication schemes employing transmit diversity in a mobile communication system. For example, such other communication schemes may include the CDMA 2000 scheme in 3GPP2 and the TDD scheme in 3GPP.

This international patent application is based on Japanese Priority Application No. 2005-120380 filed on Apr. 18, 2005, the entire contents of which are hereby incorporated by reference.

The invention claimed is:

1. A mobile station for communicating with a radio base station including one or more cells over a shared physical channel for communicating with one of the cells and a dedicated physical channel for communicating with the cells simultaneously wherein a closed loop transmit diversity for transmission with use of a plurality of antennas is applied to the radio base station, comprising:

a feedback information control unit that determines whether the mobile station is communicating to multiple cells in handover within a base station (intra-BS handover) or in handover between different base stations (inter-BS handover), calculates antenna weights for the antennas based on the determination and generates feedback information based on the calculated antenna weights, wherein if the mobile station is communicating to the cells in the inter-BS handover, the feedback information control unit determines the antenna weights for the antennas to make characteristics of the dedicated physical channel stable, and if the mobile station is communicating to the cells in the intra-BS handover, the feedback information control unit calculates the antenna weights for the antennas to optimize the shared physical channel.

2. The mobile station as claimed in claim 1,
the feedback information control unit generating the feedback information by means of a vector w such that a parameter P in a formula is maximized;

$$P = w^H(\alpha(H_1^H H_1) + (1-\alpha)(H_2^H H_2 + H_3^H H_3 + \ldots))w,$$

where $H_1$ is an estimated channel impulse response regarding the cell communicating to the shared physical channel, and $H_2, H_3, \ldots$ are estimated channel impulse responses regarding the cells communicating to the dedicated physical channel rather than the shared physical channel, wherein the parameter $\alpha(0 \leq \alpha \leq 1)$ is set to a greater value in the case of the mobile station communicating to the multiple cells in the intra-BS handover than in the case of the mobile station communicating to the multiple cells in the inter-BS handover.

3. The mobile station as claimed in claim 1,
wherein the feedback information control unit determines whether the shared physical channel is assigned to the mobile station and calculates the antenna weights for the antennas further based on the determination.

4. A method of generating feedback information in a mobile station communicating with a radio base station including one or more cells over a shared physical channel for communicating with one of the cells and a dedicated physical channel for communicating with the cells simultaneously wherein a closed loop transmit diversity for transmission by means of a plurality of antennas is applied to the radio base station, the method comprising the steps of:

determining whether the mobile station is communicating to multiple cells in handover within a base station as an intra-BS handover or in handover between different base stations as an inter-BS handover;

calculating antenna weights for the antennas based on the determination; and generating feedback information based on the calculated antenna weights, wherein if the mobile station is communicating to the cells in the inter-BS handover, the step of calculating comprises determining the antenna weights for the antennas to make characteristics of the dedicated physical channel stable, and if the mobile station is communicating to the cells in the intra-BS handover, the step of calculating comprises determining the antenna weights for the antennas to optimize the shared physical channel.

* * * * *